United States Patent
Karandikar et al.

(10) Patent No.: US 8,391,180 B2
(45) Date of Patent: Mar. 5, 2013

(54) METHOD TO DEVELOP HIERARCHICAL RING BASED TREE FOR UNICAST AND/OR MULTICAST TRAFFIC

(75) Inventors: Abhay Karandikar, Mumbai (IN); Madaiah Vinod Kumar, Bangalore (IN)

(73) Assignee: Tejas Networks Limited, Bangalore (IN)

( * ) Notice: Subject to any disclaimer, the term of this patent is extended or adjusted under 35 U.S.C. 154(b) by 349 days.

(21) Appl. No.: 12/811,874

(22) PCT Filed: Jan. 7, 2009

(86) PCT No.: PCT/IB2009/000009
§ 371 (c)(1),
(2), (4) Date: Jul. 7, 2010

(87) PCT Pub. No.: WO2009/087557
PCT Pub. Date: Jul. 16, 2009

(65) Prior Publication Data
US 2010/0290367 A1    Nov. 18, 2010

(30) Foreign Application Priority Data
Jan. 8, 2008 (IN) ................ 71/CHE/2008

(51) Int. Cl.
*H04L 12/28* (2006.01)
(52) U.S. Cl. ......... 370/254; 370/256; 370/392; 370/400
(58) Field of Classification Search .............. None
See application file for complete search history.

(56) References Cited

U.S. PATENT DOCUMENTS

| 7,760,735 B1 * | 7/2010 | Chen et al. ............ 370/392 |
| 2010/0290367 A1 * | 11/2010 | Karandikar et al. ...... 370/256 |
| 2011/0268120 A1 * | 11/2011 | Vobbilisetty et al. ..... 370/392 |

* cited by examiner

*Primary Examiner* — Robert Wilson
(74) *Attorney, Agent, or Firm* — Harness, Dickey & Pierce, PLC

(57) ABSTRACT

The present invention provides a novel method for hierarchy of preplanned protected path for both node and link failure in the realm of Carrier Ethernet Technology. In the event of failure in a hierarchy, the traffic is switched from work (primary) path to protected (secondary) path. If such path does not exist within a given hierarchy then traffic is routed through multiple hierarchies until SLA is met or no path exists. Hierarchies make the network fault resilient.

13 Claims, 9 Drawing Sheets
(9 of 9 Drawing Sheet(s) Filed in Color)

METHOD TO DEVELOP HIERARCHICAL RING BASED TREE FOR UNICAST AND/OR MULTICAST TRAFFIC

FIELD OF THE INVENTION

The present invention relates to Hierarchical Ring based Tree for unicast and/or multicast in the realm of Carrier Ethernet Transport Technology. Preferably the invention provides a novel method for hierarchy of preplanned protected path for both node and link failure.

BACKGROUND

The explosion of high bandwidth applications over Internet has fuelled the deployment of broadband optical transport networks. Some of the key applications driving the bandwidth growth include residential services like IP-TV, Video on Demand and high speed Internet and enterprise services like high-bandwidth leased lines and Virtual Private Networks (VPN). The falling prices of mobile calls and broadband services coupled with an increase in the tele-density and the uptake of broadband and 3G services have put pressure on service providers to build high capacity transport networks at dramatically lower cost per bit. In the converged telecom scenario, the service providers are looking for network access architecture that would not only provide scalable high bandwidth but at the same time offer flexibility in provisioning, Service Level Agreement (SLA) with Quality of Service (QoS) guarantees for real time traffic and protection and restoration capability, efficient multicast and network synchronization services for wireless access. Toward this goal, several new architectures have emerged.

Traditionally, SDH has been the sole transport network and carried all of the telecommunication service provider's traffic, including voice and data. One of the advantages of SDH based transport network is their 50 msec protection and restoration capability. With a shift towards Internet Protocol (IP) traffic, SDH based transport networks have proved inefficient. This has resulted in a paradigm shift towards packet based transport. With an increase of packet traffic, the SDH networks have evolved to Next Generation (NG) SDH where Ethernet frames are encapsulated in SDH payloads. The NG-SDH protocol defines mapping of SDH payload to SDH channels which are either higher order or lower order virtual containers (VC). All other features like 50 msec protection and restoration are retained. However, SDH network only supports point-to-point circuits. To provide the packet multiplexing efficiencies and any-to-any connectivity paradigm required by the data traffic, SDH devices have been enhanced by integrating the packet aggregation capabilities.

Carrier Ethernet based transport networks have emerged as the dominant choice for an efficient packet transport networks. Carrier Ethernet networks offer several value propositions like lower per-user provisioning cost, efficient and flexible transport, wide range of bandwidth etc. Ethernet based services like Virtual Private LAN Service (VPLS) are also becoming attractive service offerings. However, Ethernet in its native mode suffers from scalability, protection and restoration, traffic engineering and Quality of Service. To address these issues, Provider Bridge (IEEE 802.1ad), Provider Backbone Bridging (PBB) (IEEE 802.1ah) and PBB with Traffic Engineering (PBB-TE) (IEEE 802.1Qay) have been introduced. Ethernet has also been enhanced with Operations, Maintenance and Administration (OAM) functionality: CFM-OAM (IEEE 802.1ag) and EFM-OAM (IEEE 802.3ah). Ethernet based services can also be provided using hybrid Layer 2/Layer 3 architecture using Multiprotocol Label Switching (MPLS) and a variant of MPLS called Transport-MPLS (T-MPLS).

While PBB has attempted to address many carrier class features, protection and restoration remains an issue. IEEE 802.1d Spanning Tree Protocol (STP) is one of the first attempts to address protection in Ethernet based networks. Later this was enhanced with Rapid Spanning Tree (RSTP) (IEEE 802.1w). Some of the other attempts to address protection and restoration in Ethernet networks include Ethernet Automatic Protection Switching (EAPS) RFC 3619.

The present invention attempts to address this issue of protection and restoration in Ethernet based transport networks for both unicast and multicast traffic. Unlike the method given in
[Redundant Trees for Preplanned Recovery in Arbitrary Vertex-Redundant or Edge-Redundant Graphs
Muriel M'edard and et. al. IEEE/ACM TRANSACTIONS ON NETWORKING, VOL. 7 NO. 5, OCTOBER 1999], our method is a systematic method. Also our method is not greedy. Moreover our method does not give singularity of work tree and a singularity of protect tree.

The available protection mechanisms for multicast traffic are not efficient. For example, a 1:1 or 1+1 backup tree is maintained to carry the affected multicast traffic. This mechanism sets up a backup tree at the time of connection establishment thus, leading to delay in setting up the traffic because finding such a tree at the time of connection establishment will take time proportional to the network complexity. Management of such a network is not simple and easy.

SUMMARY

The primary object of the present invention is to provide a novel method for hierarchy of preplanned protected path for both node and link failure and in the event of failure offer hierarchy of protected or alternate paths to every node in a network whose nodes have the property of at-least two-connectedness.

Yet another object of the present invention is to address both unicast and multicast traffic. Still another object of the present invention is to provide a mechanism by which restoration can be achieved within 50 msec.

Still another object of the present invention is to provide simple and easy Operation, Administration and Management of such a network.

Still another object of the present invention is to provide very simple to understand and easy to implement methodology to achieve aforesaid objectives.

Still another object of the invention is to provide methodology to achieve these objectives within the framework of Provider Backbone Bridging based Carrier Ethernet.

Still another object of the invention is to provide a method that works in a distributed fashion and requires no central control.

Still another object of the invention is to provide a method that minimizes time for MAC address (re-) learning and QoS re-configuration.

BRIEF DESCRIPTION OF ACCOMPANYING DRAWINGS

The patent or application file contains at least one drawing executed in color. Copies of this patent or patent application publication with color drawing(s) will be provided by the Office upon request and payment of the necessary fee.

Embodiments of the invention will now be described, by way of example only, with reference to the drawings, of which:

Figure 1:
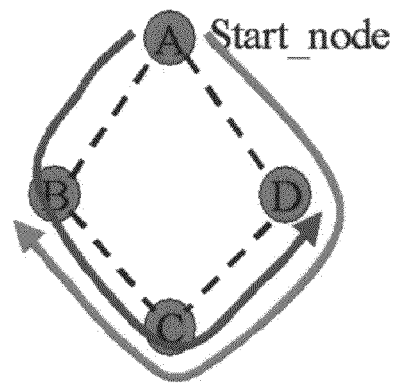
FIG. 1 shows ring topology.

FIGS. 18a, 18b, 18c and 18d show test cases 1, 2, 3 and 4.

DETAILED DESCRIPTION

A method to develop hierarchical ring based tree (HRBT) for transmission of unicast and/or multicast traffic is disclosed. The method comprises: i. broadcasting a configuration frame by a source node in a clockwise direction through a clockwise port connected to a first neighboring node and a counter-clockwise direction through a counter-clockwise port connected to a second neighboring node; ii. receiving the configuration frame by the first and second neighboring nodes and thereafter learning a media access control (MAC) address, and other related information of the source node and other nodes participating in formation of the hierarchical ring-based tree; creating a new configuration frame by the first and second neighboring nodes by appending the MAC address, a Node-ID, and other relevant information of the first and second neighboring nodes and thereby broadcasting the new configuration frame through an available port of the first neighboring node and the second neighboring node; iv. receiving the new configuration frame by a C-node from the first and second neighboring nodes and determining primary and secondary paths of the hierarchical ring based tree; v. sending notification, by the C-node, to the source node the primary and secondary paths of the hierarchical ring based tree; and vi. processing, by the source node, the notification from the C-node and sending notification to one-hop nodes through non-hierarchical ports regarding existence of a hierarchy and configuring the non-hierarchical ports in a discard state to configure the hierarchical ring based tree including the primary path and the secondary path.

In yet another embodiment of the present invention, the method enables traffic switching from the primary path to the secondary path in event of failure in the hierarchy. By hierarchy we mean that if a fault occurs within a hierarchy, logical topology change occurs only within this hierarchy. The topology or other sub-trees and hence the traffic in other hierarchies are not affected at all.

In still another embodiment of the present invention, the method routes the traffic through multiple hierarchies until SLA is met or no path exist provided the secondary path does not exist within a given hierarchy.

In still another embodiment of the present invention, the method determines the hierarchies based on link capacity in the event of link(s) or node failure.

In still another embodiment of the present invention, the method determines alternate path for affected traffic in decreasing order of priority of the affected traffic in the event of failure.

In still another embodiment of the present invention, the configuration frame includes plurality of fields selected from a group comprising Field for ordering information (Field_O), Field for carrying MAC address information (Field_MAC), Field to indicate nodes which perform comparison of configuration frame (C-nodes) (Field_C), Field to designate Primary or Secondary (Field_PS), Field to indicate which node is connected to routers (Field_R), Field to indicate nodes at which packets gets forked (Field_F), Field to indicate Pairing of C-nodes not required (Pairing_Not_Req) and combinations thereof. In still another embodiment of the present invention, the nodes which receives configuration frames performs multiple operations selected from a group comprising
  i. whether node received configuration frame simultaneously or non-simultaneously;
  ii. whether the configuration frames received contains same ID as the own Node-ID
  iii. if configuration frames are received non-simultaneously then the node compares own node-ID with the last ID of the second configuration frame so received if the ID in received configuration frame is not same as the own Node_ID or else learns MAC address, F-nodes, c-nodes and other related information of the broadcasted nodes to participate in formation of hierarchical ring-based tree.
  iv. if configuration frames are received simultaneously then the node compares the last IDs of the first two configuration frame so received if the ID in received configuration frame is not same as the own Node_ID or else learns MAC address, F-nodes, C-nodes and other related information of the broadcasted nodes to participate in formation of hierarchical ring-based tree.
  v. If configuration frame received contains non-null value for Pairing_Not_Req field then, the node forms a hierarchy without pairing C-nodes, without waiting for another configuration frame. The value of Pairing_Not_Req will be the node at which the hierarchy formation has already started. The receiving node learns MAC addresses, F-nodes, c-nodes, and other related information to participate in formation of hierarchical ring-based tree.

In still another embodiment of the present invention the method sets direction of smallest node ID as the primary path and direction of next smallest node ID as the secondary path and thereafter set bits in the Field_PS.

In still another embodiment of the present invention the value of Pairing_Not_Req is the node at which the hierarchy formation has already started.

In still another embodiment of the present invention the method configures Primary means port members of the last hop connected to the source node or F-node in discard state for traffic flowing in the secondary path.

In still another embodiment of the present invention the method configures secondary means port members of the last hop in discard state for traffic flowing in the primary path.

In still another embodiment of the present invention all the nodes configure QoS parameters on their ports appropriately to make use of new topology.

In still another embodiment of the present invention the method enables dynamic addition of node or set of linearly connected nodes to Hierarchical Ring Based Tree (HRBT) provided both newly added node or set of linearly connected nodes are capable of processing the HRBT frames.

The present invention provides a novel method to obtain hierarchy of pre-provisioned tree wherein if a node or a link failure occurs, the traffic is switched into another pre-provisioned tree. We create redundant trees on arbitrary node-redundant or link-redundant networks. These trees are such that any node is connected to the Start_node (S-node) or the root or the Fork Node (F-node) of the trees by at least one of the trees in case of node or link failure. This scheme provides rapid preplanned sub-50 millisecond recovery of communications with great flexibility in the topology design and fault recovery characteristics. Start_node or root or Fork node denotes a node where the method starts to form the trees.

We call the work tree as Primary and the protect tree as Secondary. No significance is to be attached to the words Primary (P) and Secondary (S). To get two trees, P and S, it can be shown that the topology should have connected-ness of at least 2. That is, every node is reachable from at least two nodes. Also the links must be bi-directional else some node will get disconnected. 2-connectedness implies bi-directional. Our method designs the P and S trees such that they are hierarchical in nature.

The resultant hierarchies are ring-based trees, the architecture that service providers' appreciate very much. We call our method Hierarchical Ring-Based Tree; abbreviated as HRBT.

In the following sections we will walk-through the principles of HRBT. We will first give simple examples of how the method works and then we will give the method.

Principles of Hierarchical Ring-Based Tree, HRBT

In this section we will show how the method works with three simple examples, Ring, Mesh and Complex topology. We will cover fault recovery and MAC learning in next section where we provide the method for HRBT.

Example

Ring Topology

The FIG. 1 is a Ring Topology. Nodes A, B, C, and D satisfy the 2-connectedness requirement. Node A is Start_node. The method starts at node A and gives Primary (Blue) and Secondary (Red) cycles. No significance is to be attached to the direction of arrows. The arrows only show the order in which the method adds nodes to the cycle. For example, in case of Primary cycle, the method adds Start_node first then it adds node B, then node C and finally node D. Link A-D is not part of this cycle. Link A-D is redundant for the Primary cycle. It is in discard state. Similarly, in case of Secondary cycle, the method adds Start_node first then it adds node D, then node C and finally node B. Link A-B is not part of this secondary cycle. Link A-B is redundant for the secondary cycle.

Presence of redundant link (link A-D or A-B) makes this topology tolerant to fault. This is the reason why condition of 2-connectedness was imposed on the topology. More about fault tolerance, Traffic Engineering, and MAC learning will be discussed later.

Example

Mesh Topology

Figure 2:
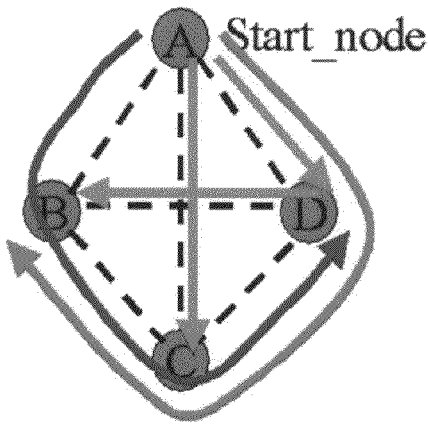
FIG. 2 shows mesh topology.

The FIG. 2 is a Mesh Topology wherein every node has a link to every other node. Nodes A, B, C, and D satisfy the 2-connectedness requirement. In fact all nodes have 3-connectedness. Node A is Start_node. The method starts at node A and gives Primary (Blue) and Secondary (Red) cycles. There is also yet another protect tree (Pink) for the Primary tree. No significance is to be attached to the arrows. The arrows only show the order in which the method adds nodes to the cycle. For example, in case of Primary cycle, the method adds Start_node first then it adds node B, then node C and finally node D. Link A-D is not part of this cycle. Link A-D is redundant for the Primary cycle. It is in discard state. Similarly, in case of Secondary cycle, the method adds Start_node first then it adds node D, then node C and finally node B. Link A-B is not part of this Secondary cycle. Link A-B is redundant for the secondary cycle. Presence of redundant links (links A-D, A-C and B-D or A-B, A-C, and B-D) makes this topology tolerant to multiple faults. This is the reason why condition of at least 2-connectedness was imposed on the topology. The Pink Tree is edge-disjoint for the Primary (Blue) tree. If all links of Primary fail, even then the network is connected through the Pink tree. But CAPEX increases with the redundant edges. More about fault tolerance, Traffic Engineering, and MAC learning will be discussed later.

Example

Two Hierarchy

So far instant disclosure has considered topology with only one hierarchy. In this example we will have the first glimpse of hierarchy. As mentioned earlier, hierarchical nature minimizes MAC learning and/or re-learning when fault occurs.

Figure 3:
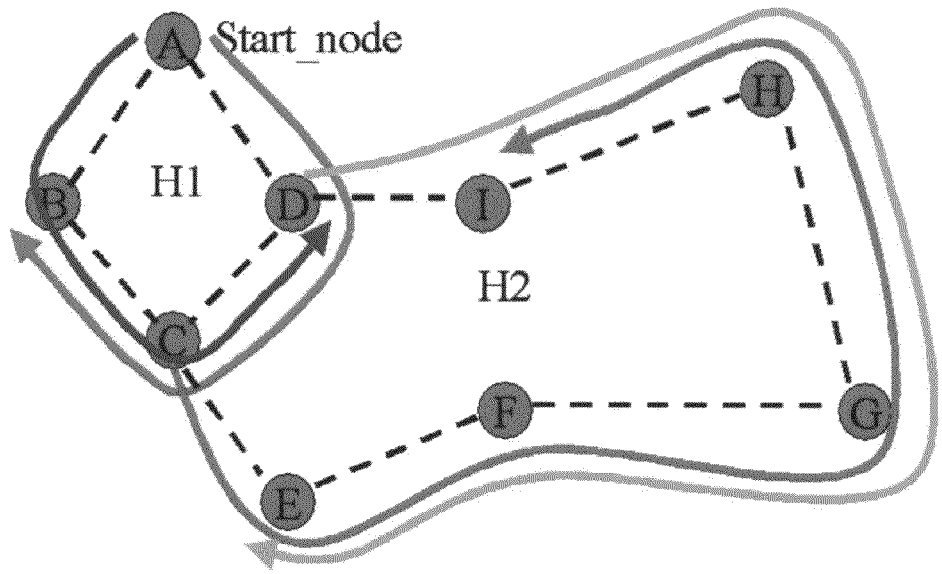
FIG. 3 shows Two-hierarchy Topology.

FIG. 3 is Double hierarchy example. H1 and H2 are two hierarchies. Nodes A, B, C, D, E, F, G, H and I satisfy the 2-connectedness requirement. In fact nodes C and D have 3-connectedness. Node A is the Start_node. The method starts at node A and gives Primary (blue) and Secondary (Red) cycles. No significance is to be attached to the arrows. The arrows only show the order in which the method adds nodes to the cycle. But there is a slight difference here. There are two Primary cycles: Blue and Sky-Blue. There are two Secondary cycles: Red and light-Red. Blue and Red cycles form H1 and Sky-blue and light-Red for H2. For example, in case of H1-Primary cycle, the method adds Start_node first then it adds node B, then node C and finally node D. Link A-D is not part of this cycle. Link A-D is redundant for the Primary cycle. It is in discard state. Similarly, in case of H1-Secondary cycle, the method adds Start_node first then it adds node D, then node C and finally node B. Link A-B is not part of this secondary cycle. Link A-B is redundant for the secondary cycle. Presence of redundant link (link A-D or A-B) makes this hierarchy tolerant to fault. This is the reason why condition of at least 2-connectedness was imposed on the topology.

Similarly H2 hierarchy is formed. Once the H1 is formed, the method starts to form H2. The method starts with node C, adds E, F, G, H and I in the same order and forms H2-Primary cycle (sky-blue). The method starts with node D, and then adds I, H, G, F and E in the same order and forms H2-Secondary cycle (light-red).

The method could as well have formed only one hierarchy (instead of H1 and H2) consisting of Primary in the order: A, B, C, E, F, G, H, I, and D and Secondary in the order: A, D, I, H, G, F, E, C, and B. Condition could be imposed on the topology as to how many hierarchies are to be obtained. But, more the hierarchy, better is the recovery time and also MAC learning and/or re-learning is minimized; this happens at the cost of 3-connectedness of nodes C and D. More about fault tolerance, Traffic Engineering, and MAC learning will be discussed later.

HRBT Method

In the previous section of instant disclosure covered how the hierarchies are to be formed.

In this section instant disclosure will show how our HRBT method actually forms hierarchies. The HRBT method is shown in FIGS. 15, 16, 17 and 18*a*, 18*b* and 18*c*. Many simple yet clever tricks are used in the HRBT method. So instant disclosure will cover step-by-step how the method works exploiting all the tricks. Then we will give the method as a flow-chart. In the next section instant disclosure address all the issues that promised to visit: Fault recovery, MAC learning, Multicasting, Traffic Engineering, etc.

Configuration Frame

At the heart of the method is configuration frame, Config_frame, which carries all relevant information to the neighbouring nodes so that they participate in the formation of hierarchical ring-based tree. CRC (FEC) is recalculated at every egress port. The information is carried in the header fields. Following are the fields that must be present in the Config_frame:

1. Field for ordering information, Field_O
2. Field for carrying MAC address information, Field_MAC
3. Field to indicate C-nodes, Field_C
4. Field to designate Primary or Secondary, Field_PS
5. Field to indicate which node is connected to routers, Field_R
6. Field to indicate nodes at which packets get Forked, Field_F
7. Field to indicate Pairing of C-nodes not required, Pairing_Not_Req Definition of Fields Meaning of Fields will become clearer once instant disclosure run through simple examples. But, first we shall define them.

Field_O carries the information of the order in which the nodes were added by the method to form cycles within a hierarchy.

Field_MAC carries the MAC address of the nodes in the same order as in Field_O.

Field_C carries the information about a node or two nodes where comparison of the node_IDs takes place. The node where comparison of node_IDs takes place is designated as C-node. Based on the information in this field, Field_PS bits are enabled and pairing of cycles takes place at the Start_node or Fork_node.

Field_PS is two-bit in size. The first bit is to indicate the direction in which primary cycle is connected to the Start_node or Fork_node. It also indicates the direction in which the secondary cycle falls one hop short to the Start_node or Fork_node. Fork_node is a node with at least two egress ports. So a Start_node is a special case of Fork_node. The second bit of Field_PS indicates the direction in which secondary cycle is connected to Start_node or Fork_node. It also indicates the direction in which the primary cycle falls one hop short to the Start_node or Fork_node.

Field_R carries information whether the node has a router attached to it. From this field every node learns the direction to routers.

Field_F contains information about the Fork_nodes encountered along the path.

Pairing_Not_Req It contains Node_ID of the node at which Hierarchy starts. In such case, paring of C-node is not required at Start_node or F-nodes.

Assumptions

Following are the assumptions:
1. Lower Node_ID has higher preference
2. Smallest (Logical) Ring also means Fastest Ring; it also means low end to end delay
3. At Start_node and Fork_node broadcast the Config_frames Let Fork-nodes be abbreviated as F-nodes. Both the C-nodes and F-nodes do selection of paths based on Node_IDs. Preference is given to the lowest Node_ID. Our method makes use of the speed of the links in the formation of hierarchies. And the set of links that form the hierarchy first will be chosen as member of the hierarchy so formed. Broadcast the Config_frame on all ports except on the incoming port through which the Config_frame was received. As Config_frame gets updated, FEC and CRC bits are recalculated at the egress ports.

HRBT Method Through Examples

Figure 4:
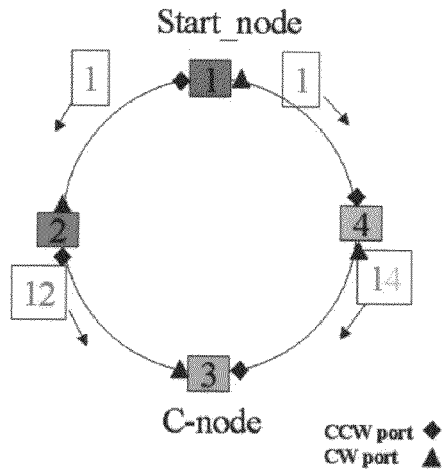
FIG. 4 shows demo of method with 4 nodes.
Figure 5:
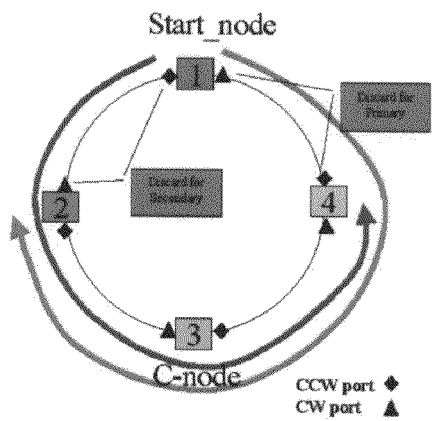
FIG. 5 shows result of method for 4 nodes scenario.

Instant disclosure will provide 3 examples that will clearly explain how the method works:
1. Ring with even (4) nodes
2. Ring with odd (5) nodes
3. Complex topology Ring with Four Nodes FIG. 4 shows the demonstration of the HRBT Method for 4 nodes and result of HRBT method is shown in FIG. 5. For simplicity, assume that propagation delay on every link is same. Later we shall cover more general case. Node 1 is the Start_node. Node 1 is also referred to as the source node. It broadcasts Config_frame on both its ports. The figure shows the two ports as Clockwise (CW) Port and Counter Clockwise (CCW) port with the legends triangle and diamond, respectively. Node 1 adds its node_ID in Field_O and its MAC address in Field_MAC. Node 1 also adds its node_ID in Field_F, because Start_node is a special case of F-node. Node 2 receives the Config_frame sent by Node 1 on its CW port, does CRC check, and learns MAC address of node 1 from Field_MAC. Node 2 also learns that node 1 is F-node. Node 2 creates a new Config_frame by appending its node_ID in Field_O, by appending its MAC address in Field_MAC; it recalculates CRC fields and broadcasts the Config_frame on the only available CCW port. Node 4 does similar operations.

Node 3 receives Config_frame from both node 2 and 4 simultaneously. And hence node 3 becomes C-node. Node 3 does CRC check and learns MAC address of nodes 1 and 2 on its CW port and MAC address of nodes 4 and 1 on its CCW port. It also learns the order in which these nodes could be reached. It also learns that node 1 is the Start_node and it could be reached through both of its ports. Now node 3 has to make one decision: which direction should it call Primary and which Secondary. To break tie, it will make decision based on the smallest of the last node_IDs in both the Config_frame that it received. The Config_frame received on CW port has 2 as the last ID in Field_O whereas that which it received on its CCW port has 4 as the last ID in Field_O. So node 3 chooses Primary direction as CW port and chooses Secondary direction as CCW port. By Primary direction we mean that Primary cycle starts on this side from node 1 and we also mean that Secondary cycle ends on this side, one hop short from node 1. By Secondary direction we mean that Secondary cycle starts on this side from node 1 and that Primary cycle ends on this side, one hop short from node 1. The C-node now has enough information to form cycles. It creates two Config_frames to be sent on two of its ports.

On the Config_frame that it sends on CW port, it appends its node_ID and all the node_IDs that it received on its CCW port in Field_O. It does similar operation on Field_MAC, Field_F and Field_R. C-node sets the first bit of Field_PS on this Config_frame. It also adds its node_ID in Field_C. In short, C-node copies all information that it received from CCW port on the Fields that it sends on its CW port.

On the Config_frame that node 3 sends on CCW port, it appends its node_ID and all the node_IDs that it received on its CW port in Field_O. It does similar operation on Field_MAC, Field_F and Field_R. C-node sets the second bit of Field_PS on this Config_frame. It also adds its node_ID in Field_C.

Operating on Field_O is easier than operating on Field_MAC. Size (in bytes) of Node_ID is set by the administrator and it will depend on the size of the domain. But, it will be considerably smaller in size than MAC address. Field_F, Field_C and Field_R could be bit-maps.

From here on we assume that CRC and FEC happens at all nodes. And we shall not mention them hereafter.

Node 2 receives Config_frame from node 3. It learns node_IDs and MAC addresses of node 3 and 4. It also learns router locations through Field_R. It learns about F-nodes through Field_F. Node 2 learns that node 3 is the C-node through Field_C. This C-node information will not be of much help to node 2. Node 2 looks at the Field_O and finds its Node_ID there. So it finds that this Config_frame is a returning frame. This return frame signifies that hierarchy is to be setup now. Node 2 looks at the bits of Field_PS and finds that Primary starts from node 1 and ends at node 4 and that Secondary starts from node 1 and ends at node 2. So it makes both its ports member of Primary cycle and makes only the CCW port member of Secondary cycle. The decision of whether a port is not to be a part of Primary or Secondary cycle is made when a node receives notification frame from start_node or fork_node. Every node will maintain two bits per port, one is to indicate member of Primary and the other is to indicate member of Secondary. Node 2 does not modify the Config_frame received from node 3. It forwards it to Node 1 as it is. Returning Config_frames are not modified.

Similar operation occurs at Node 4. Node 4 makes both its ports member of Secondary cycle and makes only the CW port member of Primary cycle. The decision of whether a port is not to be a part of Primary or Secondary cycle is made when a node receives notification frame from start_node or fork_node. Node 4 does not modify the Config_frame received from node 3. It forwards it to Node 1 as it is.

Node 1 receives two Config_frames one each from node 2 and 4. It learns all information from Field_O, Field_MAC, Field_F and Field_R. Node 1 finds its ID in Field_O so it know that this is return frame and that it has to setup a hierarchy now. From Field_PS it learns that its CCW port is discard for Secondary and its CW port is discard for Primary. It should be noted that discard/blocking of only the data traffic occurs and not of Config_frame.

Node 1 or any F-nodes will use the C-node information to pair the cycles appropriately. For example, if Node 1 had two hierarchies connected to it, then it will receive Config_frames on 4 ports. On two of its ports it will receive request to form Primary and on two ports it will receive request to form Secondary. Now the question is which Primary is to be paired with which Secondary. This tie is broken using C-node IDs that is present in Field_C. Primary and Secondary is paired if and only if the C-node IDs are identical.

The 4-node example was simple, yet it provided general operational overview of the method. What will happen if propagation delay in the 4-node example is not same? The Config_frames might cross each other mid-way over a (bi-directional) link leading to scenario where two nodes would receive non-simultaneous Config_frames on both of its ports. This situation is very similar to what happens when there is odd number of nodes in a ring. In the next example we shall tie-up this loose end.

Ring with Five Nodes

Figure 6:
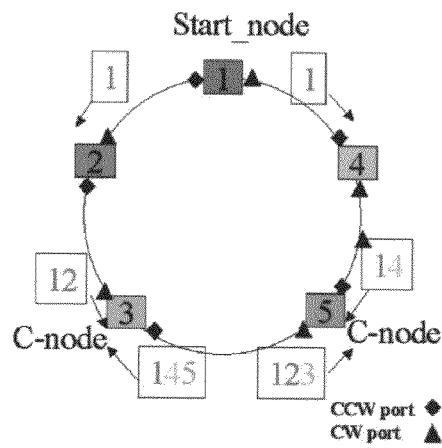
FIG. 6 shows method demo with 5 nodes.

FIG. 6 demonstrates the working of our method for 5-node scenario. This scenario will converge in the same way as a topology with unequal propagation delay per hop would. So without loss of generality lets assume propagation delay of every hop to be same.

Node 1 sends Config_frame to nodes 2 and 4. Node 2 sends Config_frame to node 3. And node 4 sends Config_frame to node 5. Node 3 learns Node_IDs and MAC addresses of 1 and 2 on its CW port and node 5 learns Node_IDs and MAC addresses of node 1 and 4 on its CCW port. In the next iteration, node 3 sends Config_frame to node 5 and node 5 sends Config_frame to node 3. Thus we see that the Config_frames cross each other over the link 3-5. Had per hop propagation delay been different and if Config_frames don't arrive simultaneously at a C-node, then Config_frames would have crossed each other over some link. Node 3 receives node_IDs and MAC addresses of nodes 1, 4 and 5 on its CCW port. Similarly, node 5 receives node_IDs and MAC addresses of nodes 1, 2 and 3 on its CW port. As both nodes 3 and 5 receive two Config_frames, they both become C-nodes.

Node 3 received two Config_frames at two different times from two different ports, it triggers comparison of Node_IDs. It compares it's own node_ID with the last Node_ID of the most recent Config_frame. In this case it compares 3 and 5. It finds 3 is less than 5 so it prefers CW port direction as Primary direction and CCW port direction as Secondary direction. Node 5 does similar comparison. It compares its Node_ID, which is 5, with the last Node_ID of the most recent Config_frame, which is 3. Node 5 chooses its CW port direction as Primary direction and CCW port direction as Secondary direction. Notice that both the nodes 3 and 5 choose the CW direction as Primary and CCW direction as the Secondary.

Once direction of Primary and Secondary were chosen, Node 3 will create Config_frame with first bit of Field_PS set, with its Node_ID in Field_C, with relevant information about router connectivity, F-nodes, etc. in appropriate Fields and send it on CW port.

Nodes 2 and 1 learn the information contained in Fields and appropriately take actions, like setting Primary and Secondary cycles, updating its tables with MAC addresses, Node_IDs, Routers, F-nodes, C-nodes, etc. Similar learning takes place at node 4 also, through the Config_frame received from Node 5.

Figure 7:
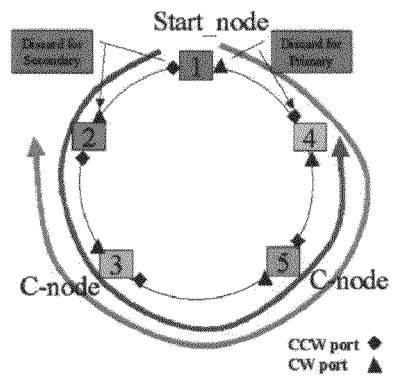
FIG. 7 shows convergence result of method.

The final result is shown in FIG. 7. CCW port of node 1 and CW port of node 2 is in Discard for Secondary traffic. Similarly CW port of node 1 and CCW port of node 4 is in Discard for Primary traffic. Config_frame is never discarded or blocked by the Discard ports.

Example

Two Hierarchy Topology

So far we considered only one Hierarchy example. These two examples have demonstrated the working of the HRBT method. Now we will cover two-hierarchy example. HRBT method always tries to maximize the number of Hierarchies possible.

Figure 8:
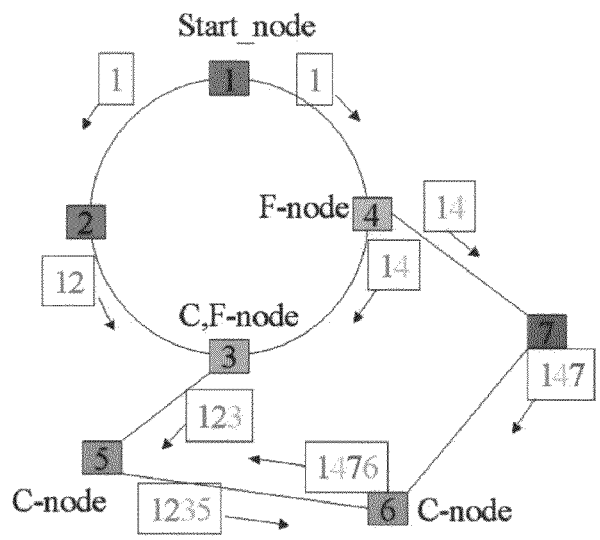
FIG. 8 shows method demo Two-Hierarchy Topology.

FIG. 8 shows a topology of 7 nodes. There are two F-nodes (nodes 3 and 4), three C-nodes (nodes 3, 5 and 6) and one Start_node (node 1). We will cover this example in iterations so that it will be easy to understand how the method works. We assume per hop propagation delay is identical for every hop.

Iteration 1:
1. Node 1 broadcasts Config_frame to nodes 2 and 4.

Iteration 2:
1. Nodes 2 and 4 receive Config_frame from node 1. Nodes 2 and 4 learn the MAC address of node 1.
2. Node 2 broadcasts Config_frame to node 3.
3. Node 4 is F-node. It broadcasts Config_frame to nodes 3 and 7.

Iteration 3:
1. Node 3 receives Config_frames from both node 2 and 4. Node 3 learns MAC address of 1, 2 and 4.
2. Node 7 receives Config_frame from node 4. Node 7 learns MAC address of node 1 and 4.
3. Node 3 becomes C-node. It compares the last Node_ID in both the Config_frames that it receives, i.e. it compares 2 and 4 and prefers 2. It declares the direction towards node 2 as Primary and direction towards node 4 as Secondary. It sets first bit of Field_PS and sends towards node 2. It sets the second bit of Field_PS and sends towards node 4. Remember that there are two bits per port that indicates if the port is a member of Primary and Secondary. It enables both bits on both directions. So all four bits are set on two of its ports.
4. Node 3 sends return Config_frame towards nodes 2 and 4. Towards node 2 the Config_frame contains first bit set in Field_PS. Towards node 4 the Config_frame contains second bit set in Field_PS.
5. Node 3 randomly chooses the order information to be sent in Config_frame towards node 5. It could send 1, 2 and 3 in Field_O towards node 5 or it could send 1, 4, and 3 towards node 5. In this particular case it chose 1, 2 and 3 as the contents of Field_O. It does not matter what is the content of the Field_O as long as they are consistent.
6. Node 7 broadcasts Config_frame towards node 6.

Iteration 4:
1. Node 2 receives returning Config_frame from node 3. Node 2 learns MAC address of nodes 3 and 4. It does not learn the MAC addresses of nodes 5, 6, and 7. MAC addresses of nodes 5, 6, and 7 can be learnt only when a config_frame is updated by them. Node 2 sets Primary bit and Secondary bit on both its ports. Only the start-node or F-node can notify the nodes to clear one of these bits.
2. Node 4 receives returning Config_frame from node 3. Node 4 learns MAC address of nodes 2 and 3. Notice that Node 4 knows that it has to send this returning Config_frame towards node 1 and not node 7. This it learns from the ordering information contained in Field_O. It does not learn the MAC addresses of nodes 5, 6, and 7. MAC addresses of nodes 5, 6, and 7 can be learnt only when a config_frame is updated by them. Node 2 sets Primary bit and Secondary bit on both its ports. Only the F-node can notify the nodes to clear one of these bits.
3. Node 5 receives Config_frame from node 3. Node 5 learns MAC address of nodes 1, 2 and 4. It does not learn the MAC addresses of nodes 5, 6, and 7.
4. Node 6 receives Config_frame from node 7. Node 6 learns MAC address of nodes 1, 4, and 7.
5. Notice that Primary and Secondary cycles are established from node 2 to node 4 via node 5.
6. Node 2 sends Config_frame to node 1.
7. Node 4 sends Config_frame to node 1.
8. Node 5 broadcasts Config_frame to node 6.
9. Node 6 broadcasts Config_frame to node 5.

Iteration 5:
1. Node 1 receives two Config_frames from nodes 2 and 4. Node 1 learns that node 3 is C-node. Primary cycle is established from node 1 to node 4 via nodes 2 and 3. Secondary cycle is established from node 1 to node 2 via nodes 4 and 3. Node 1 learns MAC addresses of node 2, 3 and 4. It does not learn the MAC addresses of nodes 5, 6, and 7. Node 1 sends a notification message to node 2 to clear the Secondary bit on node 2's CW port. With similar notification message node 4 clears Primary bit on its CCW port.
2. Node 5 has received two Config_frames at two different times from two different ports. So it becomes C-node. It compares between its own Node_ID and the last Node_ID in the recent Config_frame and selects Primary as the direction towards node 3. Node 5 learns MAC address of nodes 1, 2, and 3 on one of its port and learns MAC addresses of nodes 1, 4, 7 and 6 on the other port.
3. Node 6 has received two Config_frames at two different times from two different ports. So it also becomes C-node. It compares between its own Node_ID and the last Node_ID in the recent Config_frame and selects Secondary as the direction towards node 7. Node 6 learns MAC address of nodes 1, 2, 3 and 5 on one of its port and learns MAC addresses of nodes 1, 4, and 7 on the other port.
4. Node 5 sends return Config_frame towards node 3. The first bit of Field_PS is set.
5. Node 6 sends return Config_frame towards node 7. The second bit of Field_PS is set.

Iteration 6:
1. Node 3 receives return Config_frame from node 5. It learns MAC addresses of nodes 5, 6 and 7. So now it knows the MAC addresses of all nodes in the domain. It also sees request to establish Primary. First hierarchy is already established at node 3. So it assumes the new request as a request for another hierarchy. It puts the port towards node 5 in Discard state and notifies node 5 about this. On receiving notification from node 3, Node 5 clears Secondary bit on the port towards node 3. Every node establishes both Primary and Secondary on its ports. When it receives Discard notification message from the F-node it sets the ingress port in discards state for the appropriate cycle. Node 5 learns that Primary starts from node 3 and Secondary ends with itself. Primary is established between nodes 3 and 5.
2. Node 7 receives return Config_frame from node 6. It learns MAC addresses of nodes 1, 2, 3 and 5. It sets Primary and Secondary on both its port.
3. Node 7 sends return Config_frame to node 4.

Iteration 7:
1. Node 4 receives return Config_frame from node 7. It learns MAC addresses of nodes 5, 6 and 7. So now it knows the MAC addresses of all nodes in the domain. It also sees request to establish Secondary. First hierarchy is already established at node 4. So it assumes the new request as a request for another hierarchy. It puts the port towards node 7 in Discard state and notifies node 7 about this. Node 7 learns that Secondary starts from node 4 and that Primary cycle ends with itself. On receiving notification from node 4, Node 7 clears the Secondary bit on its port directed towards node 4. Secondary is established between nodes 4, 7, 6 and 5. Primary is established between nodes 3, 5, 6, and 7.
2. There are two hierarchies now. Nodes 1 and 2 do not learn MAC addresses of nodes 5, 6, and 7. This can be solved by forcing F-nodes to broadcast the MAC addresses that it learns when a new hierarchy gets established at its port. We will cover this later.

The convergence result is shown in 9. From this two-hierarchy example we see that new operation is required at F-nodes. This operation being: notifying the nodes regarding existence of a hierarchy and also intimating the ports to go to discard state. This is what happened between nodes 1 and 2, 1 and 4, 3 and 5 and nodes 4 and 7.

Notice that in two-hierarchy example, there were two paths between nodes 3 and 4. One path consisted of just an individual bi-directional link. The other path consisted of nodes 3, 5, 6, 7 and 4. Because we assumed that propagation delay per hop is same, the path with just one hop, link 3-4, turned out to be faster compared to the path with nodes 3, 5, 6, 7 and 4. On the other hand, had the link speed of every link along the path 3, 5, 6, 7 and 4 been 10 times faster than the link speed 3-4 then Hierarchy 1 would have involved nodes 1, 2, 3, 5, 6, 7, and 4; and Hierarchy 2 would not have even existed at all. All nodes would end up in Hierarchy 1. Thus, we see how the concept of fastest path in a network affects the final result. Fastest cycle ends up forming the Hierarchy, first.

MAC Learning

All mention to MAC learning will be in the context of two-hierarchy example that we have just covered. Notice that in the two-hierarchy example, nodes 1, 2, and 4 do not learn the existence of another Hierarchy, and thus do not learn the MAC addresses of the nodes 5, 6, and 7. Nodes 3 and 4 learn the existence of two Hierarchies, because they have received Config_frames from both hierarchies. Nodes 1, 2, and 4 do not learn the existence of the second Hierarchy, because they do not receive the Config_frames of the second Hierarchy.

Figure 9:
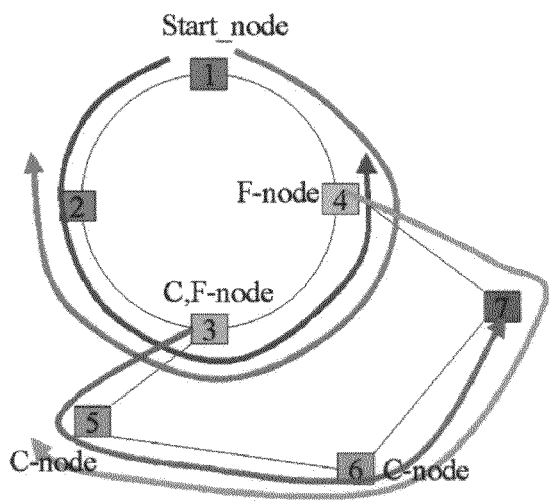
FIG. 9 shows convergence of method for two-hierarchy topology.

Information of H2 is identically available at both nodes 3 and 4. And so we could use one of these two nodes to broadcast the MAC addresses of the nodes involved in the second Hierarchy. So which node will broadcast the MAC address information? The F-node with the lowest Node_ID will broadcast the information to every other Hierarchy. Notice that every Hierarchy has a node (node 3 in two-hierarchy example) from where Primary cycle of this Hierarchy starts. Without confusion, one could choose this node to broadcast the MAC address information. In two-hierarchy example of FIG. 9, node 3 will broadcast to Hierarchy 1. Alternatively, if time is the issue then both nodes 3 and 4 could broadcast the MAC address information; and if any node receives the same information twice then it could process this information intelligently. MAC address information goes from F-nodes of newly formed Hierarchy to all other Hierarchies whether already formed or are in the process of formation.

Fault Recovery

Now that we have shown how every node learns the MAC addresses of every other node, we will now show how the HRBT method recovers from Node or Link Failure. We will cover Link Failure. Case of Node failure is similar in operation.

Fault Recovery in Ring Topology

Figure 10:
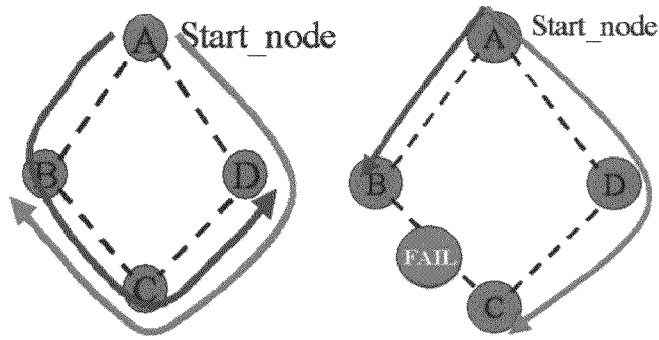
FIG. 10 shows ring topology with fault recovery.

Now consider the Ring topology shown in FIG. 10. Left side figure shows how the Primary and the Secondary trees are formed using HRBT Method. Assume that only Primary is used to send traffic; this implies that link A-D is unused. If link B-C fails, then the new truncated-Primary and the new truncated-Secondary will still form a tree such that every node is still connected by at least one tree.

When node B gets to know about fault from its PHY, it immediately sends CFM message to the Start_node (or F-node of its Hierarchy). The CFM message does not leave the Hierarchy. After sending CFM message node B copies all the QoS parameters including MAC table entries from its CCW port onto its CW port. Some low priority traffic gets hit! Configuring QoS parameters may lead to copying scheduling schemes, Buffer management schemes, MAC table entries modification, etc. from one port to the other port. Since every node exactly knows how the QoS parameters should be configured after the fault, the time spent in re-learning all QoS parameters is minimized drastically. Node A does not copy all of its QoS parameters from CCW port onto its CW port. It copies only the QoS parameters of the traffic flowing towards nodes C and D onto its CW port.

Node C also sends CFM message towards D as soon as it gets to learn about the link failure. After sending CFM message node C copies all the QoS parameters from its CW port onto its CCW port. Some low priority traffic gets hit! Node D processes the CFM message similarly. Between nodes A and B Primary is active and between nodes A, D and C Secondary is active. Fault recovery happens in sub-50 millisecond due to automatically pre-provisioned trees. Thus Traffic Engineering is inherent in HRBT. This is the elegance of this Method.

Fault Recovery in Two-Hierarchy Topology

Figure 11:
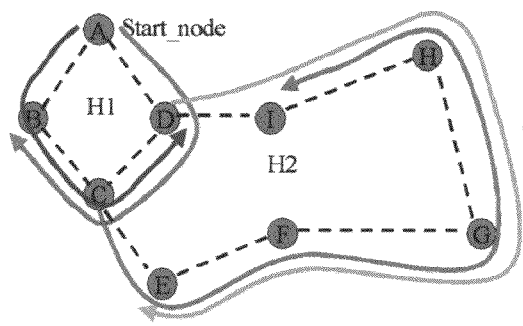
FIG. 11 shows formation of hierarchies.

Now consider the two-Hierarchy example shown in FIGS. 11, 12, 13 and 14. FIG. 11 shows how the Primary and the Secondary trees are formed using HRBT Method. Assume that initially only Primary is used to send traffic. This means that links A-D and D-I are unused and that only Blue cycle and Sky-Blue cycle in H1 and H2 are used.

Figure 12:
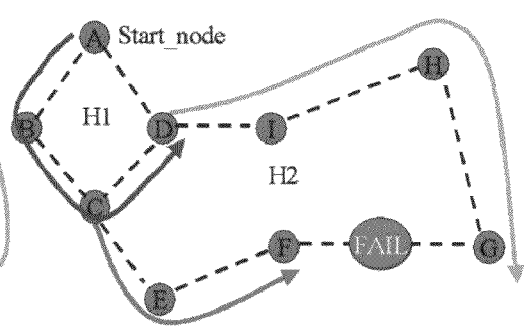
FIG. 12 shows fault recovery at hierarchy 2 (H2).

FIG. 12 shows a scenario when link F-G fails. The CFM messages sent by nodes F and G will reach only up to nodes C and D respectively. All the nodes configure the QoS parameters on their ports appropriately to make use of the new topology. Low priority traffic may also get hit. This re-configuring will take sub-50 millisecond due to pre-provisioned and hierarchical trees. Because of hierarchical nature, the topology and hence QoS parameters in H1 remains un-disturbed.

Figure 13:
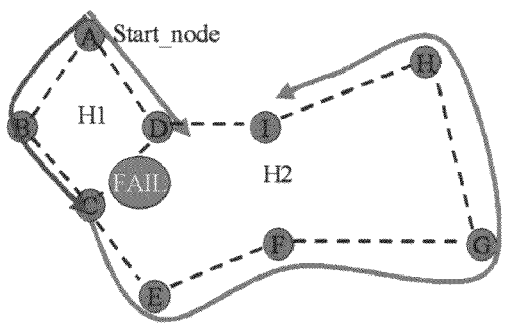
FIG. 13 shows fault recovery at hierarchy 1 (H1).

FIG. 13 shows a scenario when link C-D fails. The final result of switching of QoS parameters is obvious from the Figure and will not be discussed further.

Figure 14:
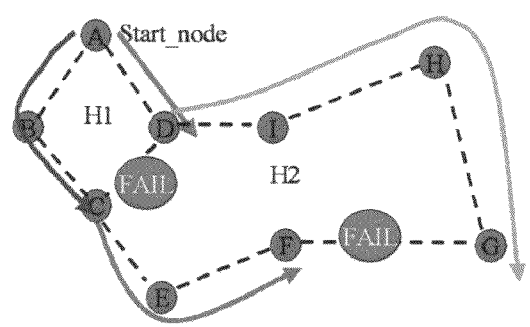
FIG. 14 shows two fault recovery

FIG. 14 is an interesting example, for it shows that the topology is resilient to two failures. This is because the faults occur on two Hierarchies, one on each Hierarchy. The final result of switching of QoS parameters is shown in the Figure.

Multicasting Strategy

Various multicasting protocols exist. Many of them are standard methods. But, as on date Protection of multicast traffic is not addressed. This is the first time where protection of multicast traffic and restoration of multicast traffic is addressed convincingly. HRBT method is used for protection and restoration of both unicast and Multicast traffic. This happens as follows: work tree or the main tree of the multicast group will be assigned on the Primary trees of every hierarchy. Work tree is the tree on which multicast traffic flows when it is set up. HRBT gives protected path for every path. So for every work tree there is a protected path. Which implies: for every multicast work tree there is a multicast protected tree. In the event of failure of a path the traffic is switched into alternate pre-provisioned protected path. Because the protected path is pre-provisioned, Traffic Engineering and QoS parameters of the affected traffic can be moved from Work or Primary direction to Protection or Secondary direction in very minimal time or the order of 50 milliseconds.

HRBT Flowchart:

The individual block within the flowchart is explained in the beginning and subsequently how they coherently work as HRBT method using some test cases is explained. (Note that this flowchart is one instance of the implementation of HRBT method. HRBT method could be realized through other methods as well.) The instant disclosure shall explain flow-chart from left arrow towards the right arrow. Along every arrow we shall go from top to down. That is the order of explanation we will be: Block 1, Block 2, etc. Please see the figure and the numberings, 1, 2, 3, etc., therein.

Figure 15:
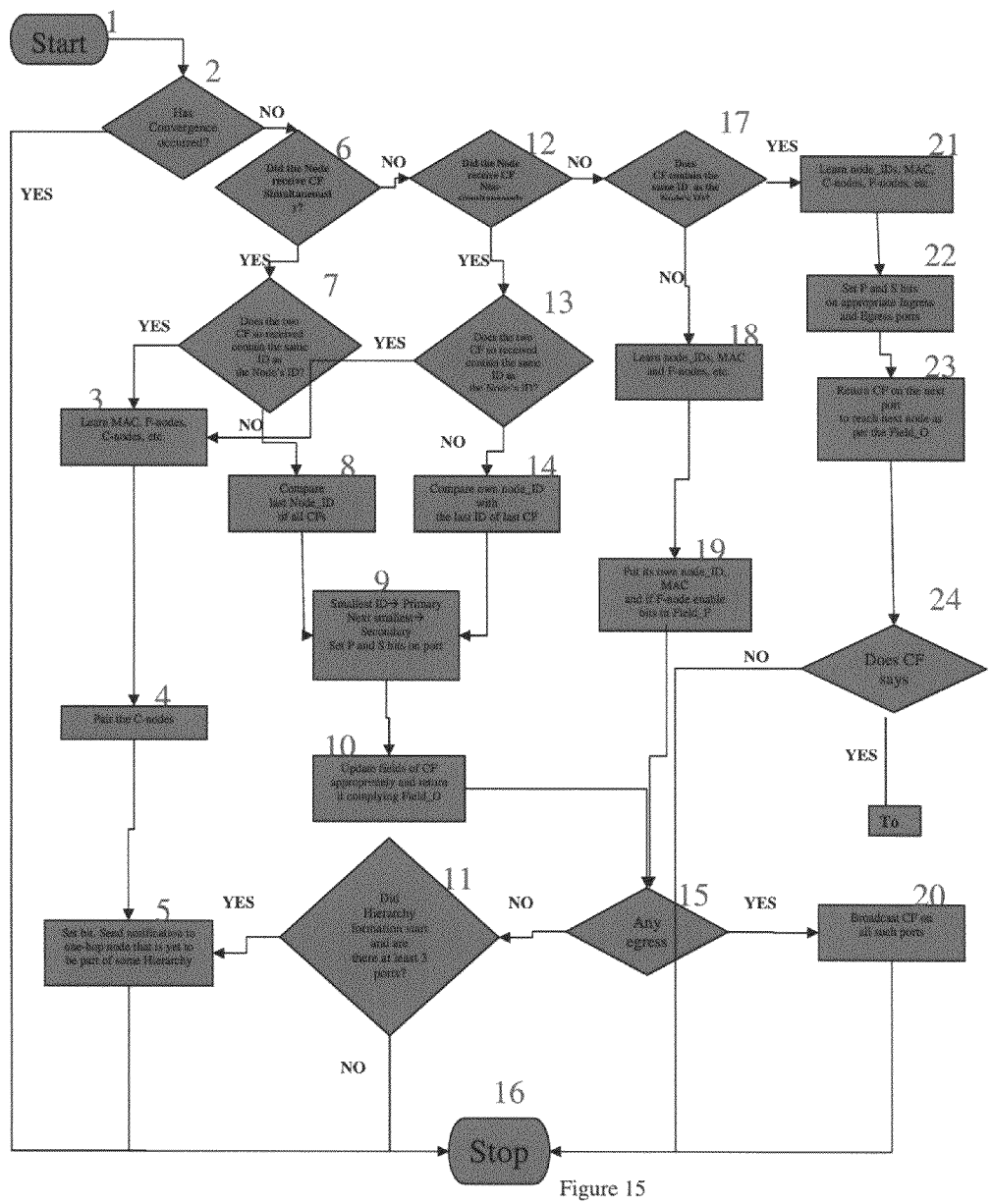
FIG. 15 shows flowchart which describes working of Configuration Process or Configuration Frame.

The HRBT starts when a dummy or empty or seed CF frame is inserted into the source node as shown in FIG. 15. The source node will follow 1, 2, 6, 12, 17, 18, 19, 20 and 16.

Block 1:
It is start block. The HRBT method commences from this block within every node.

Block 2:
This block checks if HRBT has converged. Convergence means that all participating ports of the node have become part of Hierarchy or Hierarchies.

Block 3:
The node learns following information from the Configuration Frame: MAC addresses, Fork nodes (F-nodes), Comparison nodes (C-nodes), Node IDs, etc. This block is reached after comparison of node ID has taken place at C-nodes. That is, for the returning Configuration Frame.

Block 4:
Pairing of Primary and Secondary by identifying C-node ID takes place. This block is important for correct pairing of the Primaries with the Secondary of corresponding Hierarchy. Example, if there is possibility of two Hierarchies at the source node, then the source node will receive request to form two Primary and two Secondary. The source node will resolve the ambiguity, as to which primary to be paired with which secondary, using the C-node IDs contained within Field_C, the C-node field, of the Configuration Frame.

Block 5:
The node notifies the member ports of the adjacent links to become member of Primary or Secondary cycle of a Hierarchy. If there are two C-node IDs (when CF is received non-simultaneously, see Block 12) in the returning CF then, direction of lower C-node ID is used to determine Primary ports. Ports designated Primary will be discard for Secondary. And vice-versa happens for higher C-node ID. Alternatively, the returning CF may have a field to indicate Primary or Secondary cycle of a Hierarchy, Field_PS. If there is only one C-node (when CF is received simultaneously, see Block 6) then member ports of one link will be discard for Primary and member ports of other link will be discard for Secondary. Suitable tie-breaker could also be used.

Block 6:
This block checks if the node has received two or more CF simultaneously.
If yes, then the node could be either C-node or the source node. Simultaneous means reception of one more CF from another port before an updated CF is broadcasted.

Block 7:
This block checks if the CF frame is a returning frame or not. A CF frame is a returning frame if its node ID is already present in the field. A CF will be returned by a C-node after comparing the node IDs as will be explained in Block 8.

Block 8:
If the node IDs present in the CF is not same as the node ID of the present node, then the node will become C-node. C-node compares the recently appended node IDs within all the CF that were received simultaneously.

Block 9:
Choice is made on Primary direction and Secondary direction. Direction of the smallest node ID is designated as Primary and direction of the next smallest node ID is designated as Secondary. Within a given Hierarchy, Primary means port members of the last hop (connected to the source node or F-node) will be in discard state for traffic flowing in the secondary path; Secondary means port members of the last hop will be in discard state for traffic flowing in the primary path. Notice that Primary (Secondary) and primary (secondary) are not identical. Capitalization indicates states. They essentially break loop for primary (work) and secondary (protect) traffic. Note that traffic on both primary and secondary path is bi-directional. Every port has two bits, one of which is set if the port becomes part of primary cycle and the other bit is set if the port becomes part of secondary. By default both bits are set immediately after the comparison process. The bits are reset through notification process, Block 5.

Block 10:
Modification to CF happens. CF is updated with node ID, and with MAC address of the present node. If the present node is an F-node then Field_F is updated with node ID. If the present node is a C-node then Field_C is updated appropriately based on simultaneous or non-simultaneous reception of CF. In case of simultaneous reception of CF there will be only one updation to Field_C, whereas in case of non-simultaneous reception of CF there will be two updations to Field_C. Ordering information is updated within Field_O of CF. Forward CF on appropriate port, towards the source node, destined to the node address as per the information contained within Field_O of CF.

Block 11:
Checks if a Hierarchy already exist or formation of hierarchy has already started. This is useful to prevent propagation of returning CF through a hierarchy that is being formed or is already formed. This forms Hierarchy at the F-nodes through notification process.

Block 12:
Check if CF frames were received non-simultaneously.

Block 13:
Check if the CF is returning frame or not.

Block 14:
Compare own node ID with the recently appended node ID within the CF that was received second among the non-simultaneous CF frames.

Block 15:
Check if there are ports through which CF was not received so far.

Block 16:
Stop. Algorithm converged. All participating ports are member of at least one hierarchy.

Block 17:
Check if CF contains node ID that is same as present node's ID.

Block 18:
Learn information contained within CF: MAC addresses, node IDs, F-nodes, etc. This block is similar to Block 3 in function.

Block 19:
Update the CF by appending MAC address and Node ID of the present node at appropriate location with the CF. Update Field_F and Field_C if relevant.

Block 20:
Broadcast CF on all participating ports through which CF was not received yet.

Block 21:
Learn information contained within CF: MAC addresses, node IDs, F-nodes, C-nodes, etc. This block is similar to Block 3 in function.

Block 22:
Set P and S bits on appropriate ingress and egress ports. Egress port will be that port through which CF was received for the first time and is not part of any Hierarchy yet. Information on Egress port is contained in ordering information contained within Field_O of CF. If the egress port is part of some hierarchy then Block 5 gets executed.

Block 23:
Forward CF on appropriate port, towards the source node, destined to the node address as per the information contained within Field_O of CF.

Block 24:
Does the field Pairing_Not_Req contain non-null value? Non-null value would imply that paring based on C-nodes is not required at source node or F-nodes. The value of Pairing_Not_Req is the node ID at which hierarchy formation has already started.

Figure 16:
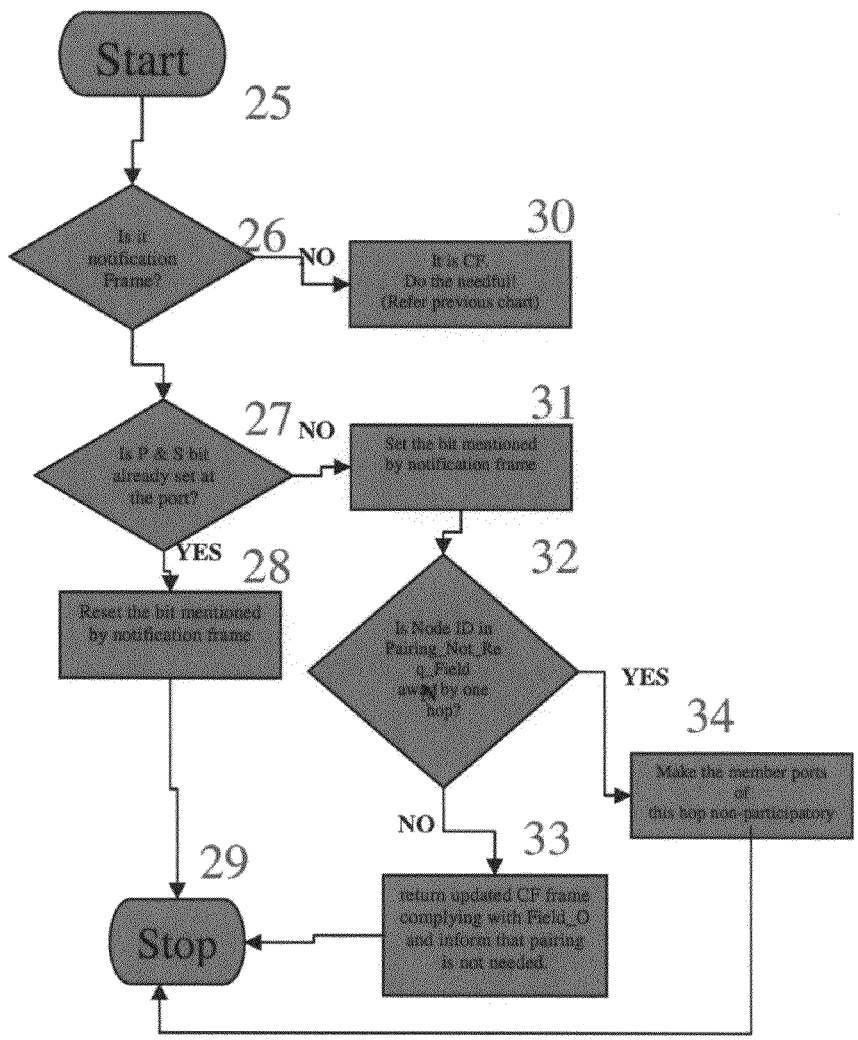
FIG. 16 shows flow chart for notification process or notification frame.
Figure 17:
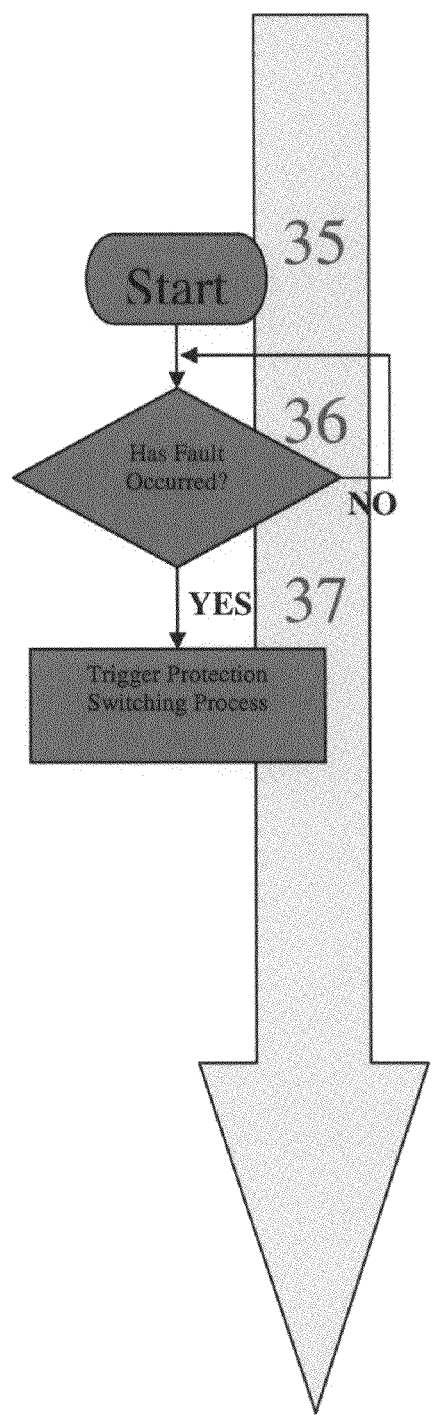
FIG. 17 shows flowchart for working of fault notification process.

Blocks 25 to 34 are part of notification process (refer FIG. 16). Only notification process can break a loop on Primary and Secondary cycle to give work and protect path.

Block 25:
Start.

Block 26:
Check if the frame is a notification frame. Notification frame is uniquely identifiable.

Block 27:
Check if P and S bits are set at the port.

Block 28:
Reset bit, either P or S. Information about which bit to be reset is contained in Notification Frame. The bit that is reset will indicate loop break for corresponding cycle. If P bit is reset then it would mean that Primary cycle terminates at the hop.

Block 29:
Stop.

Block 30:
If the received frame is CF then execute the blocks 1 to 24 appropriately.

Block 31:
Set the bit mentioned by the notification frame.

Block 32:
Check if the node_ID present in Pairing_Not_Req field is one hop away.

Block 33:
Return CF on proper egress port with MAC, node ID, F-node, etc complying with Field_O. Preserve information in Pairing_Not_Req field.

Block 34:
Make the member ports non-participatory.

Blocks 35 to 37 handles fault. (Refer FIG. 17)

Block 35:
Start.

Block 36:
Check if fault has occurred. This can be inferred through CFM or similar mechanism.

Block 37:
Trigger protection switching mechanism. Example, work traffic could be channel through protection path in case of 1:1 protection.

Figure 18A:
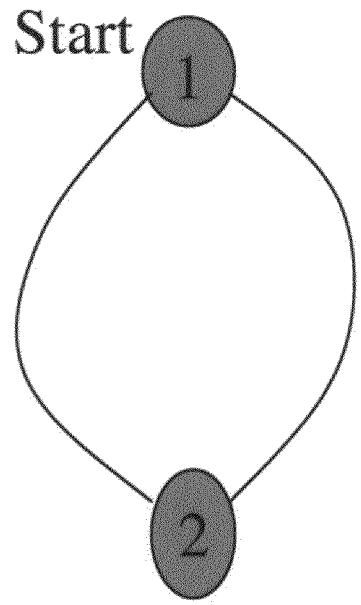

Test Cases:
Case 1: Two nodes only as shown in FIG. 18a. It is abstraction of ring. Node 1 is start node. Node 2 is C-node. All intermediate nodes and the connecting links between node 1 and 2 are abstracted as one logical link and are hence not shown in the figure. In this example we assume total delay between node 1 and 2 is same along both logical paths.

Figure 18B:
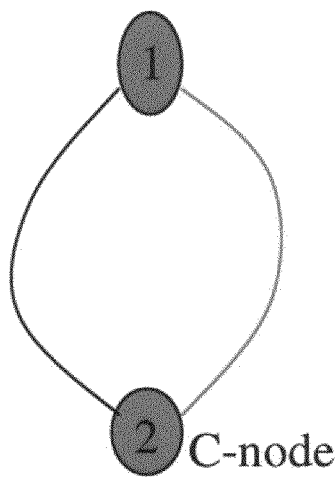

The example is like LAG between node 1 and 2
Hop delay is same
Node 1 broadcasts CF
Node 1 follows->1, 2, 6, 12, 17, 18, 19, 15, 20 and 16 blocks mentioned in FIG. 15.
Node 2 receives CF on two ports simultaneously and follows->1, 2, 6, 7, 8, 9, 10, 15, 11, and 16 blocks mentioned in FIG. 15.
Node 2 converged and follows->1, 2 and 16 always until fault occurs
Node 1 receives returning CF with its node_ID and C-node_ID as node 2.
Node 1 follows->1, 2, 6, 7, 3, 4, 5, and 16
Node 1 converged and follows->1, 2 and 16 always until fault occurs Case 2: Two nodes only as shown in FIG. 18b. It is abstraction of ring. Node 1 is start node and happens to be also a C-node. Node 2 is forwarding node. All intermediate nodes and the connecting links between node 1 and 2 are abstracted as one logical link and hence not shown in the figure. In this example we assume total delay between node 1 and 2 is different along the two logical paths.

Figure 18C:
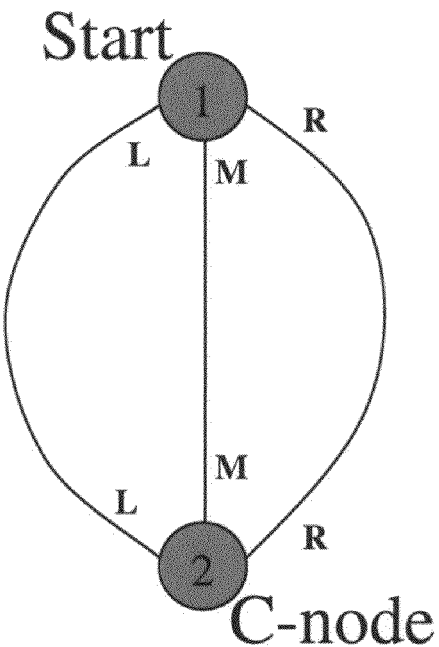

It is like LAG between node 1 and 2
Hop delay is NOT same
Red (Right) path is slower than Black (Left) path
Node 1 broadcasts CF
Node 1 follows->1, 2, 6, 12, 17, 18, 19, 15, 20 and 16 blocks mentioned in FIG. 15.
Node 2 forwards the first CF received from faster link towards the slower link; follows->1, 2, 6, 12, 17, 18, 19, 15, 20, and 16 blocks mentioned in FIG. 15.
Node 2 receives CF non-simultaneously through the slower link and follows->1, 2, 6, 12, 13, 14, 9, 10, 15, 11 and 16 blocks mentioned in FIG. 15.
Evidently, node 2 becomes a C-node. Chooses faster link direction as Secondary and Slower link direction as Primary. Returns CF on the faster link only.
Node 2 converged and follows->1, 2 and 16 blocks mentioned in FIG. 15 always until fault occurs
Node 1 receives two types of CF, one forwarded CF on the slower link and other is returning CF on the faster link
For forwarded CF node 1 also becomes a C-node. Chooses faster link direction as Secondary and Slower link direction as Primary. Returns CF on the slower link only to itself. But it also knows that it is start node.
Both nodes will choose P and S direction without conflict
Now Node 1 receives two returning CF simultaneously with its node_ID and C-node_ID with values as 1 and 2.
Node 1 follows->1, 2, 6, 7, 3, 4, 5, and 16.
Takes appropriate action to notify ports on slower link to be part of Primary only.
Similarly, Node 1 notifies ports on faster link to be part of Secondary only.
Node 1 converged and follows->1, 2 and 16 always until fault occurs Case 3: Two nodes and 3 links as shown in FIG. 18c. Node 1 is a start node. Node 2 is C-node. All intermediate nodes and the connecting links between node 1 and 2 are abstracted as one logical link and hence not shown in the figure. In this example we assume total delay between node 1 and 2 is same along all three logical paths.

It is like triple-LAG between node 1 and 2
It is tricky example because three CF are received at 2
Hop delay is same
Node 1 broadcasts CF
Node 1 follows->1, 2, 6, 12, 17, 18, 19, 15, 20 and 16

Node 2 receives CF on three ports simultaneously and follows->1, 2, 6, 7, 8, 9, 10, 15, 11, 5 and 16

Notice that first two CFs are used to start formation of Hierarchy. The third CF is then used in the notification process with value of node 2 in the field Pairing_Not_Req.

Node 1 receives 2 returning CF and one Notification frame with Pairing_Not_Req value as 2.

Node 1 follows on two returning CF->1, 2, 6, 7, 3, 4, 5, and 16

On the reception of Notification from node 1 on link L, node 2 does->24, 25, 26, 27, and 28

On the reception of Notification from node 1 on link M, node 2 does->24, 25, 26, 27, and 28

Node 2 converged and follows->1, 2 and 16 always until fault occurs

Node 1 follows->25, 26, 27, 31, 32, 34, and 29.

Node 1 converged and follows->1, 2 and 16 always until fault occurs

Figure 18D:
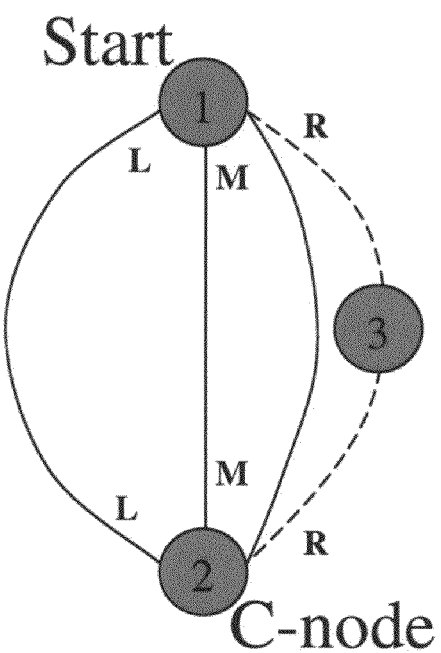

Case 4: Three nodes and 3 logical links as shown in FIG. 18d. Node 1 is a start node. Node 2 is C-node. Node 3 is the only intermediate node between node 1 and 2. All intermediate nodes and the connecting links between node 1 and 2 are abstracted as one logical link and hence not shown in the figure. In this example we assume total delay between node 1 and 2 is same along all three logical paths. Physical links are identified as dash lines (------)

It is like triple-LAG

Hop delay is same along the 3 paths

It is tricky when three CF are simultaneously received at 2

Node 1 broadcasts CF; follows->1, 2, 6, 12, 17, 18, 19, 15, 20 and 16

Node 3 forwards the CF to node 2->1, 2, 6, 12, 17, 18, 19, 15, 20 and 16

Node 2 receives CF on three ports simultaneously and follows->1, 2, 6, 7, 8, 9, 10, 15, 11, 5 and 16

Notice that first two CFs are used to start formation of Hierarchy. The third CF is then used in the notification process with value of node 2 in the field Pairing_Not_Req.

Node 3 follows->25, 26, 27, 31, 32, 33, and 29

Node 1 receives three CF, one of which has value of node 2 in Pairing_Not_Req field.

Node 1 follows for port L and M->1, 2, 6, 7, 3, 4, 5, and 16.

Node 1 also follows for port R->1, 2, 6, 12, 17, 21, 22, 23, 24, 5, and 16

On the reception of Notification from node 1 on link L, node 2 does->24, 25, 26, 27, and 28

On the reception of Notification from node 1 on link M, node 2 does->24, 25, 26, 27, and 28

Node 2 converged and follows->1, 2 and 16 always until fault occurs

Node 3 converged and follows->1, 2 and 16 always until fault occurs

Node 1 converged and follows->1, 2 and 16 always until fault occurs

Dynamic Addition of Node or Set of Linearly Connected Nodes to HRBT Topology of Network:

The node that is to be dual-home connected with HRBT network should be capable of processing HRBT frames. Two of its connecting ports should be made participatory, meaning they should be able to process HRBT frames.

The ports on the HRBT network, on which this new node is going to be connected, should also be made participatory.

As soon as the link is up, ports on the HRBT network will send CF to the new node. HRBT frames will be first sent only from the HRBT network towards the new node and not the other way around.

When a set of linearly connected nodes is to be dual-homed with the HRBT network should be capable of processing HRBT frames. Now the situation is exactly same as of a single node getting dual-home connection, wherein the set of linearly connected nodes can be abstracted as one logical node.

Note: When a port is made participatory from non-participatory, it would mean that HRBT has not converged on that node. So nothing new is to be done to handle dynamic addition of node to the already converged HRBT topology of network.

We claim:

1. A method to develop hierarchical ring based tree (HRBT) for transmission of unicast and/or multicast traffic, said method comprising steps of:
    i. broadcasting a configuration frame by a source node in a clockwise direction through a clockwise port connected to a first neighboring node and in a counter-clockwise direction through a counter-clockwise port connected to a second neighboring node;
    ii. receiving the configuration frame by the first and second neighboring nodes and thereafter learning a media access control (MAC) address, and other related information of the source node and other nodes participating in formation of the hierarchical ring-based tree;
    iii. creating a new configuration frame by the first and second neighboring nodes by appending the MAC address, a Node-ID, and other relevant information of the first and second neighboring nodes and thereby broadcasting the new configuration frame through an available port of the first neighboring node and the second neighboring node;
    iv. receiving the new configuration frame by a C-node from the first and second neighboring nodes and determining primary and secondary paths of the hierarchical ring based tree;
    v. sending notification, by the C-node, to the source node to determine the primary and secondary paths of the hierarchical ring based tree; and
    vi. processing, by the source node, the notification from the C-node and sending notification to one-hop nodes through non-hierarchical ports regarding existence of a hierarchy and configuring the non-hierarchical ports in a discard state to configure the hierarchical ring based tree including the primary path and the secondary path.

2. The method as claimed in claim 1, wherein the method enables traffic switching from the primary path to the secondary path in event of a node failure or a link failure.

3. The method as claimed in claim 2, wherein the method routes the traffic through one or more hierarchies until service level agreement (SLA) is met or no path exists.

4. The method as in claim 1, the method further comprises determining one or more hierarchies of ring of the hierarchical ring based tree based on a fastest link or a link capacity.

5. The method as claimed in claim 1, further comprising determining the secondary path for affected traffic in decreasing order of priority of the affected traffic in the event of a node failure or a link failure.

6. The method as claimed in claim 1, wherein the configuration frame includes plurality of fields selected from a group comprising Field for ordering information (Field_O), Field for carrying MAC address information (Field_MAC), Field to indicate nodes which compare configuration frames called C-nodes (Field_C), Field to designate Primary or Secondary (Field_PS), Field to indicate which node is connected to routers (Field_R), Field to indicate nodes at which packets gets forked (Field_F), Field to indicate Pairing of C-nodes not required (Pairing_Not_Req).

7. The method as claimed in claim 1, wherein the C node performs a plurality of operations selected from a group comprising
   i. checking whether the new configuration frame was received simultaneously or non-simultaneously;
   ii. checking whether the new configuration frame includes a node-ID that is the same as a node-ID of the C-node;
   iii. if the new configuration frames was received non-simultaneously then the C-node compares the node-ID of the C-node with the node-ID of the new configuration frame, and, if the node-ID of the new configuration frame is not the same as the node-ID of the C-node learns MAC address, F-nodes, c-nodes and other related information of broadcasting nodes participating in formation of the hierarchical ring-based tree;
   iv. if the new configuration frames was received simultaneously then the C-node compares Node-IDs of two configuration frames received and if the node-IDs in the two configuration frames are not the same as the node-ID of the C-node, the C-node learns MAC address, F-nodes, c-nodes and other related information of the broadcasting nodes participating in formation of the hierarchical ring-based tree; and
   v. if the new configuration frame received contains a non-null value for a Pairing_Not_Req field then, the source node forms a hierarchy without pairing C-nodes and without waiting for another configuration frame and nodes receiving the new configuration frame learn MAC addresses, F-nodes, c-nodes, and other related information of broadcasting nodes participating in formation of the hierarchical ring-based tree.

8. The method as claimed in claim 7, further comprising the C-node determining a direction of a smallest node ID in the two configuration frames as the primary path and determining a direction of a next smallest node ID as the secondary path and thereafter setting bits in a Field_PS field.

9. The method as claimed in claim 7, wherein the value of the Pairing_Not_Req is a node at which the hierarchy formation has started.

10. The method as claimed in claim 1, further comprising configuring a primary port member of a one hop node connected to the source node or an F-node in the discard state for traffic flowing in the secondary path.

11. The method as claimed in claim 1, further comprising configuring a secondary port member of a one hop node in the discard state for traffic flowing in the primary path.

12. The method as claimed in claim 1, wherein all nodes in the hierarchical ring based tree configure quality of service (QoS) parameters on their ports appropriately to make use of a new topology.

13. The method as claimed in claim 1, wherein the method enables dynamic addition of a node or a set of linearly connected nodes to the Hierarchical Ring Based Tree (HRBT) provided that the newly added node or the set of linearly connected nodes process HRBT frames.

* * * * *